(12) United States Patent
Underwood

(10) Patent No.: US 6,659,582 B2
(45) Date of Patent: Dec. 9, 2003

(54) APPARATUS AND METHOD FOR FORTIFICATION OF BLACK PIGMENT BASED INK USING BLACK DYE BASED INK

(75) Inventor: John A. Underwood, Vancouver, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 46 days.

(21) Appl. No.: 09/983,919

(22) Filed: Oct. 26, 2001

(65) Prior Publication Data

US 2003/0081029 A1 May 1, 2003

(51) Int. Cl.[7] .................... B41J 29/38; G01D 11/00
(52) U.S. Cl. ................................ 347/14; 347/100
(58) Field of Search .................... 347/14, 100

(56) References Cited

U.S. PATENT DOCUMENTS

| | | | |
|---|---|---|---|
| 5,745,140 A | | 4/1998 | Stoffel et al. ............ 347/100 |
| 6,079,807 A | * | 6/2000 | Lindstrom et al. ......... 347/16 |
| 6,086,198 A | | 7/2000 | Shields et al. ............ 347/100 |
| 6,123,411 A | * | 9/2000 | Inui et al. ................ 347/43 |
| 6,234,601 B1 | * | 5/2001 | Hayashi et al. ........... 347/16 |
| 6,267,476 B1 | * | 7/2001 | Kato et al. .............. 347/100 |
| 6,342,095 B1 | * | 1/2002 | Takizawa et al. ........ 106/31.23 |

\* cited by examiner

Primary Examiner—Stephen D. Meier
Assistant Examiner—Alfred Dudding

(57) ABSTRACT

A method and apparatus for improving the print quality of a print job having black content. The black content is configured to be applied on a predetermined location on a print medium. In the method, the black content is fortified by applying a black dye based ink on the predetermined location and the black content is printed by applying a black pigment based ink on the predetermined location. The apparatus includes a first printhead configured to fire black dye based ink droplets on the print medium, a second printhead configured to fire black pigment based ink droplets on the print medium and a processing system configured to fortify the black content by controlling the first printhead to fire droplets on the predetermined location. The processing system is further configured to print the black content by controlling the second printhead to fire droplets on the predetermined location.

3 Claims, 3 Drawing Sheets

APPARATUS AND METHOD FOR FORTIFICATION OF BLACK PIGMENT BASED INK USING BLACK DYE BASED INK

FIELD OF THE INVENTION

This invention relates generally to printers, and more particularly, although not exclusively, to inkjet printers.

BACKGROUND OF THE INVENTION

It is generally known that inkjet printers utilize black pigment based inks to print text and line drawings. This is due to pigment based inks being relatively more opaque and lightfast than dye based inks. However, dye based inks are particularly suited to the production of color images. In this regard, conventional printers designed to print both text and color images may utilize a black pigment based ink and a set of dye based inks (e.g., cyan, yellow and magenta). For example, U.S. Pat. No. 5,745,140, assigned to the HEWLETT-PACKARD COMPANY, discloses a color inkjet printer with pigment black and dye based color inks and the disclosure of which is hereby incorporated by reference in its entirety.

While black pigment based ink is generally regarded as being superior to black dye based ink for text and line drawing, conventional black pigment based ink does have a number of disadvantages. Specifically, conventional black pigment based ink has a greater capacity to clog the printhead nozzles. In an effort to reduce the effects of decap (e.g., clogged nozzles, pigment migration, etc.), a multitude of patents have disclosed various manner of improvements. For example, inks with extended drying times have been developed. However, slow drying inks generally produce higher levels of image quality defects associated with so-called "bleed". Bleed is a term of art used to describe excessive spreading of an ink on a print medium as well as the infiltration of one color into another on the print medium. In this regard, U.S. Pat. No. 6,086,198, assigned to the HEWLETT-PACKARD COMPANY, discloses a set of inks for reducing or eliminating color bleed, the disclosure of which is hereby incorporated by reference in its entirety.

Additionally, while pigment based ink is relatively more opaque than dye based ink, to ensure highly opaque black regions, various conventional printing systems have been developed to "fortify" black printed areas. Some of these fortification methods have the added benefit of reducing the drying time by utilizing an interaction between the dye based and pigment based inks. For example, it is generally known to use dye based cyan and magenta (colored) inks as a fortification for pigmented black ink. The colored inks are deposited on the print medium and the black ink is subsequently deposited over the colored inks. The colored inks and the black ink may interact. Thus producing a more opaque black that dries relatively faster and bleeds relatively less. However, to reduce the possibility of the colored inks being visible around the edges of the black region, the colored inks are not deposited around the edges of the black region. Due to the lack of fortification about the edges of black regions, color fortification of black regions may not adequately conceal defects associated with decap. Furthermore, hue shift defects (e.g., purple tones) are often evident in regions of color fortification.

SUMMARY OF THE INVENTION

In one respect, the invention pertains to a method of improving the print quality of a print job having black content. The black content has a predetermined location on a print medium. In the method, the black content is fortified by applying a black dye based ink on the predetermined location and the black content is printed by applying a black pigment based ink on the predetermined location.

In another respect, the invention pertains to an apparatus for improving the print quality of a print job having black content. The black content has a predetermined location on a print medium. The apparatus includes a first printhead configured to fire black dye based ink droplets on the print medium, a second printhead configured to fire black pigment based ink droplets on the print medium and a processing system configured to fortify the black content by controlling the first printhead to fire droplets on the predetermined location. The processing system is further configured to print the black content by controlling the second printhead to fire droplets on the predetermined location.

In comparison to known prior art, certain embodiments of the invention are capable of achieving certain aspects, including some or all of the following: (1) elimination of hue shift defects associated with color fortification of black pigment based ink; (2) improving throughput via the removal of fortification firmware; (3) reducing defects associated with decap and (4) improving image quality on glossy print medium. Those skilled in the art will appreciate these and other aspects of various embodiments of the invention upon reading the following detailed description of a preferred embodiment with reference to the below-listed drawings.

DETAILED DESCRIPTION OF A PREFERRED EMBODIMENT

For simplicity and illustrative purposes, the principles of the invention are described by referring mainly to an exemplary embodiment thereof, particularly with references to a system to fortify black pigment based ink with black dye based ink. However, one of ordinary skill in the art would readily recognize that the same principles are equally applicable to, and may be implemented in, a system capable of under laying one colorant with a second, similarly colored, colorant having dissimilar chemistry, and that any such variations are within the scope of the invention. While in the following description numerous specific details are set forth in order to provide a thorough understanding of an embodiment of the invention, in other instances, well known methods and structures have not been described in detail so as not to obscure the invention.

Figure 1:
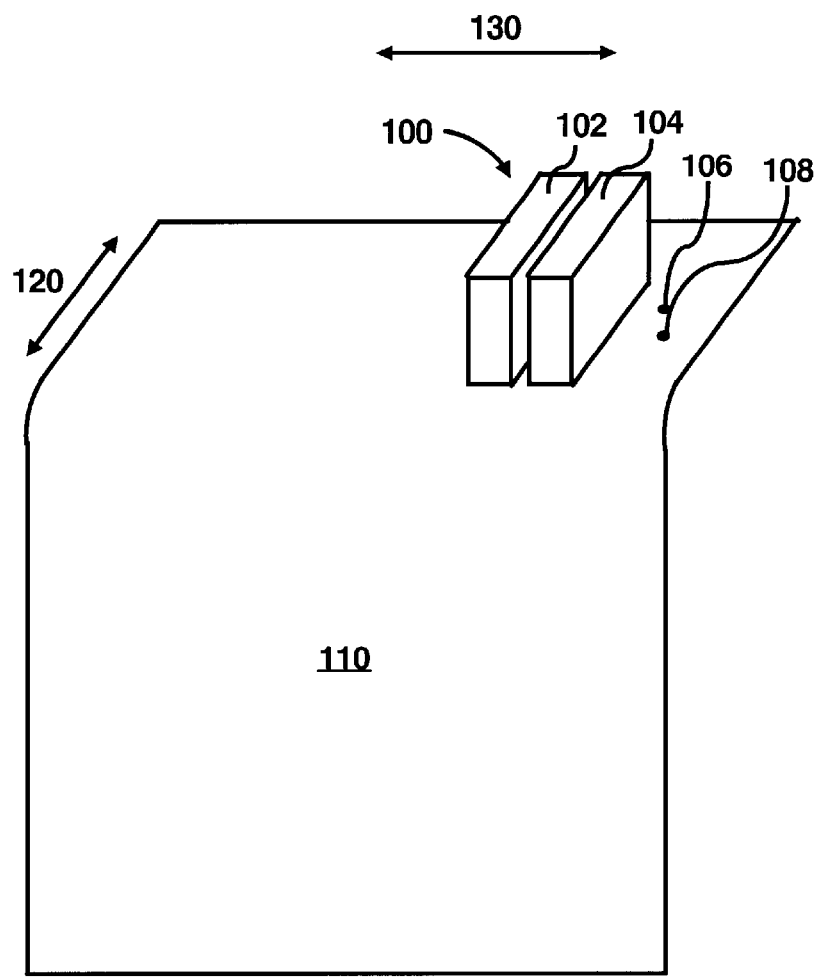
FIG. 1 is a simplified schematic view illustrating a portion of a printing device according to an embodiment of the invention.

As seen in FIG. 1, there is schematically illustrated part of a printer device (e.g., a printer) suitable for implementation in an embodiment of the invention. The printer has an array of printheads 100 in a substantially parallel row. More specifically, FIG. 1 illustrates two printheads 102 and 104. Each of the printheads 102 and 104 includes a plurality of printer nozzles (not shown), arranged in one or more rows, for firing ink onto a print medium 110 e.g., sheet of paper. Although FIG. 1 depicts the printer as having two printheads 102 and 104, printer devices have been known to possess any number of printheads, e.g., three, four, or more.

Typically, the printheads 102 and 104 may be constrained to move in a direction 130 with respect to the print medium 110. In addition, the print medium 110 may be constrained to move in a further direction 120. During a normal print operation, the printheads 102 and 104 may be moved into a first position with respect to the print medium 110 and a plurality of ink droplets may be fired from the same plurality of printer nozzles contained within each of the printheads 102 and 104. In this manner, pixels (e.g., spots) of ink similar to pixels 106–108 may be placed on the print medium 110. After completion of a print operation, the printheads 102 and 104 may be moved in a direction 130 to a second position and another print operation is performed. In a like manner, the printheads 102 and 104 may be repeatedly moved in a direction 130 across the print medium 110 and a print operation may be performed after each such movement of the printheads 102 and 104. When the printheads 102 and 104 reach an edge of the print medium 110, the print medium may be moved a short distance in a direction 120, parallel to a main length of the print medium 110, and another print operation may be performed. The printheads 102 and 104 may then moved in a direction 130 back across the print medium 110 and yet another print operation may be performed. In this manner, a complete printed page may be produced.

A more detailed description of the printer device illustrated in FIG. 1 may found in commonly assigned application Ser. No. 09/502,667 filed on Feb. 11, 2000, by Xavier Bruch et al., the disclosure of which is hereby incorporated by reference in its entirety.

In the following description of FIG. 2, and for the purpose of this disclosure, the terms "fortify" and its variants, as used herein, may be defined as the production of a black region with a black dye based ink and a black pigment based ink. The black dye based ink may be said to fortify the black pigment based ink. The black dye based ink may fortify a subset or essentially every pixel location within the black region. Additionally, the term "black content" refers to any type of text, line and/or image produced with at least some black ink.

Figure 2:
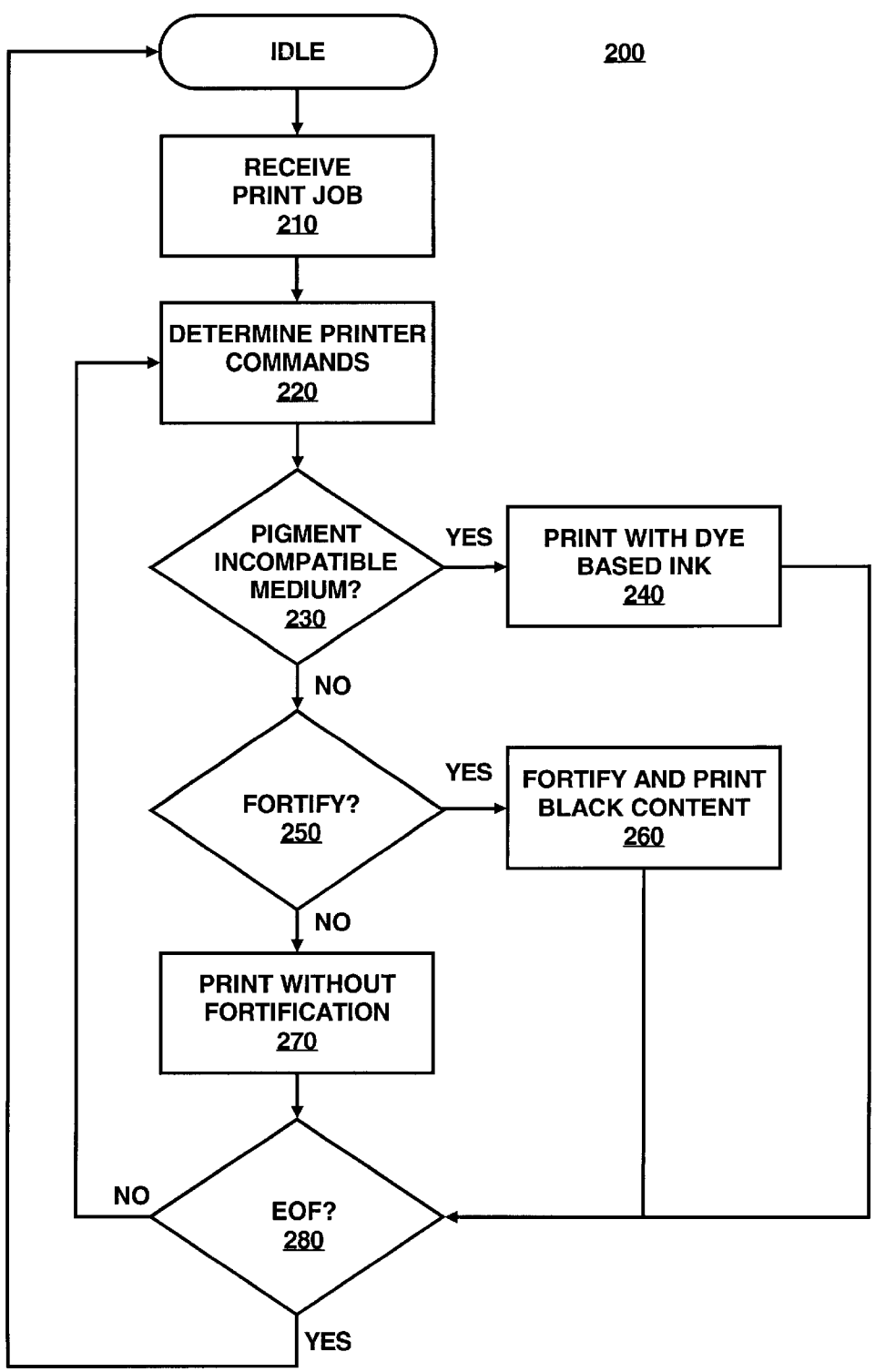
FIG. 2 is a flow chart of a method, according to an embodiment of the invention.

FIG. 2 is a flow chart of a method 200, according to an embodiment of the invention. As depicted in FIG. 2, the method 200 is initiated in response to receiving a print job at step 210. The print job is typically initiated by a user operating a computer or terminal on the local area network ("LAN") in which a printer is located. However, it is within the scope of this invention that the print job may be received in any manner known to those skilled in the art. For example, the printer may be directly attached to a computer. Furthermore, it is within the scope of this invention that the printer and the print job input device (e.g., keyboard, scanner, etc.) is a single device. For example, an electronic typewriter and/or "all in one device", such as a printer/copier/fax machine.

At step 220, in a manner known to those skilled in the art, the print job may be converted into a stream of data corresponding to printer specific commands generated in response to the print job. In general, the printer specific commands may include commands associated with media movement, printhead movement, nozzle firing, etc.

At step 230, it may be determined if the print medium is incompatible with pigment based ink. An example of a print medium that is incompatible with pigment based ink is glossy print medium because the pigment may not properly adhere and may flake off. Additionally, pigment based ink may produce a noticeably different sheen on glossy print medium and thus, may be unacceptable for certain printing applications (e.g., photo imaging and the like). Furthermore other print medium (e.g., various plastics, certain fabric, etc.) may also be incompatible with pigment based ink. In any event, if it is determined that the print medium is incompatible with pigment based ink, the method 200 may proceed to step 240. If it is determined that the print medium is compatible with pigment based ink, the method 200 may proceed to step 250.

At step 240, the printer specific commands may be accessed, modified as required and in a process known to those skilled in the art, utilized to control the movements and operations of the printer. Modifications made to the printer specific commands may include essentially replacing commands associated with pigment based ink with commands associated with dye based inks. Typically, conventional inkjet printers utilize "process" black to replace pigment based black ink when printing on pigment incompatible medium. The terms "process" and "composite" black may be defined as black color that is produced by mixing a plurality of colored inks (e.g., cyan, yellow and magenta) on the print medium. However, producing process black may decrease throughput. Process black may also be more prone to hue shift defects and thus, may not appear truly black. The method 200 may thus improve throughput and print quality by utilizing black dye based ink to replace black pigment based ink. Additionally, the method 200 may save about ⅓ to ½ of the cost associated the ink due to the relatively low cost of black dye based ink as compared to the relatively high cost of colored inks utilized to produce process black. Following step 240, the method 200 may proceed to step 280.

At step 250, it may be determined whether to fortify the pigment based ink. The decision may be based on some or all of the following factors: color of content, selected print mode, type of content (e.g., text, image, etc.), size and shape of area to be fortified, etc. If it is determined to fortify the pigment based ink, the method 200 may proceed to step 260. If it is determined to print without fortification of the pigment based ink, the method 200 may proceed to step 270.

At step 260, the printer specific commands may be accessed, modified as required and in a process known to those skilled in the art, utilized to control the movements and operations of the printer. Modifications made to the printer specific commands may include essentially duplicating some or all of the commands associated with printing certain types of content. In a preferred form, some or all of the commands associated with printing black content may be essentially duplicated such that both pigment based black ink and dye based black ink may be utilized to print the black content. In various forms, fortification may be performed such that black dye based ink is printed as a uniform, partial density pattern coextensive with the black content. In other forms, fortification may be performed such that the edges, the interior or the entirety of the black content is printed with both black dye based ink and black pigment based ink.

Contrary to conventional fortification methods utilizing process black, in the method 200, it may be preferable to apply the black dye based ink, at least, on the edge of the black content. In this regard, due to the fact that image quality defects associated with hue shift are generally not exhibited when fortifying black pigment based ink with black dye based ink, fortification on the edge of the black content with black dye based ink may reduce image quality defects associated with decap. Following step 260, the method 200 may proceed to step 280.

At step 270, the printer specific commands may be accessed and in a process known to those skilled in the art, utilized to control the movements and operations of the printer to print the content without fortification. Following step 270, the method 200 may proceed to step 280.

At step 280, the printer specific commands may be accessed to determine whether the print job has been completed. For example, if an end of file ("EOF") is encountered, it may be determined that the print job has been completed. If it is determined the print job has been completed, the method 200 may return to the idle step to wait for another print job. If it is determined content remains to be printed, the method 200 may return to step 220.

The method 200 may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Concrete examples of the foregoing include distribution of the program(s) on a CD ROM or via Internet download. In a sense, the Internet itself, as an abstract entity, is a computer readable medium. The same is true of computer networks in general.

Figure 3:
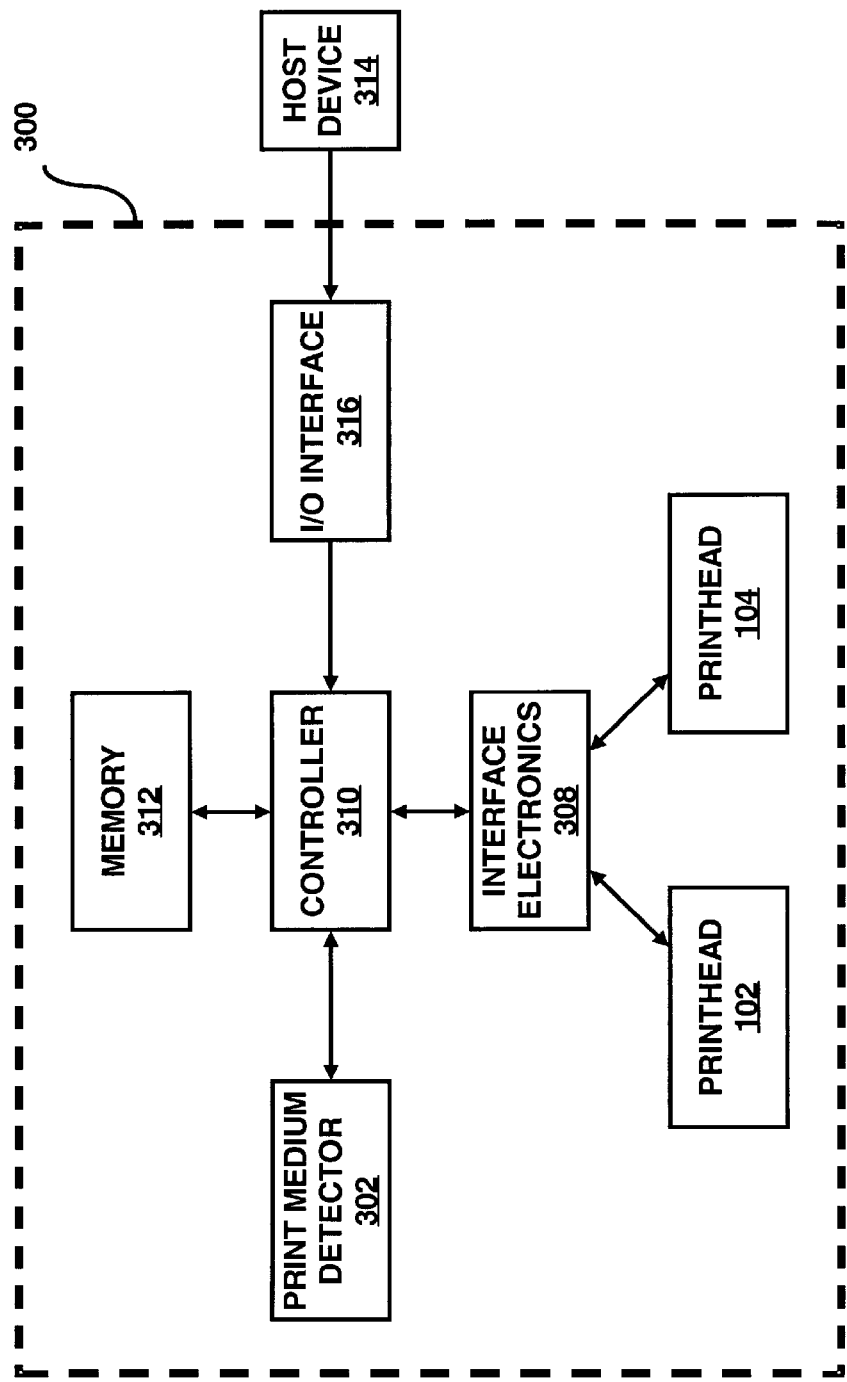
FIG. 3 is a block diagram of a system, according to an embodiment of the invention.

Referring to FIG. 3, there is illustrated an exemplary block diagram of a printer 300 in accordance with the principles of the present invention. The following description of the block diagram illustrates one manner in which a printer 300 having a printhead 102 configured to fire droplets of black dye based ink and a printhead 104 configured to fire droplets of black pigment based ink may be operated in accordance with the principles of the present invention. In this respect, it is to be understood that the following description of the block diagram is but one manner of a variety of different manners in which such a printer may be operated.

Generally speaking, the printer 300 includes the printheads 102 and 104, although additional printheads may be included. The description of the printheads 102 and 104 in the present disclosure is for purposes of simplicity and is not meant as a limitation. In this regard, the printer 300 may include any reasonably suitable number of printheads, e.g., two, four, six, and the like, configured to operate in the manner described hereinbelow with respect to the printheads 102 and 104. It should be understood and readily apparent to those skilled in the art that the fortification technique disclosed herein may be implemented in any reasonably suitable type of printer without departing from the scope of the invention.

The printheads 102 and 104 may be configured to repeatedly pass across a medium in individual, horizontal swaths or passes during a printing operation to print a particular image (e.g., picture, text, diagrams, etc.) onto the medium. In addition, the printheads 102 and 104 may be configured to contain a plurality of nozzles (not shown) individually operable to be implemented during each pass to apply an ink pattern onto the medium and thus print the particular image.

In this regard, the printheads 102 and 104 may comprise conventional thermal inkjet or piezoelectric printheads, both of which are generally known to those skilled in the art. In a preferred form, the fortification may be performed in a manner such that the black dye based ink present in the printhead 102 is fired on the print medium before the black pigment based ink present in the printhead 104.

The printer 300 may also include interface electronics 308. The interface electronics 308 may be configured to provide an interface between a controller 310 of the printer 300 and the components for moving the printheads 102 and 104, e.g., a carriage, belt and pulley system (not shown), etc. The interface electronics 308 may include, for example, circuits for moving the carriage, moving the medium, firing individual resistors or piezoelectric elements in the nozzles of the printheads 102 and 104, and the like.

The controller 310 may be configured to provide control logic for the printer 300, which provides the functionality for the printer. In this respect, the controller 310 may possess a microprocessor, a micro-controller, an application specific integrated circuit, and the like. The controller 310 may be interfaced with a memory 312 configured to provide storage of a computer software that provides the functionality of the printer 300 and may be executed by the controller. The memory 312 may also be configured to provide a temporary storage area for data/file received by the printer 300 from a host device 314, such as a computer, server, workstation, and the like. The memory 312 may be implemented as a combination of volatile and non-volatile memory, such as dynamic random access memory ("RAM"), EEPROM, flash memory, and the like. It is also within the purview of the present invention that the memory 312 may be included in the host device 314.

The controller 310 may further be interfaced with an I/O interface 316 configured to provide a communication channel between a host device 314 and the printer 300. The I/O interface 316 may conform to protocols such as RS-232, parallel, small computer system interface, universal serial bus, etc. In addition, the controller 310 may be interfaced with a print medium detector 302.

The print medium detector 302 may be configured to determine the print medium type. For example, such factors as the thickness, height, width and reflective properties of the print medium and the print medium source may be sensed and utilized to determine the print medium type. Additionally, various print mediums may include indicators such as notches, bar codes and the like and the print medium detector 302 may be configured to sense the indicators.

Although the host device 314 is depicted as distinct from the printer 300, it is widely known that the functionality of the host device 314 may be subsumed within the printer 300. For example, an electronic typewriter or a printer/scanner/fax/copier machine may incorporate some or all of the functionality of the host device 314 within the printer 300. The host device 314 may be configured for two way communication with the printer 300. In a preferred form, the host device 314 may be configured to forward print jobs to the printer 300. Additionally, the host device 314 may be operable as a user interface for the printer 300. In this regard, the host device may be configured to provide the capability to select a printmode, print medium type, etc. Furthermore, although not depicted in FIG. 3, the printer 300 may include a user interface.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. An apparatus for improving the print quality of a print job having black content, the black content having a predetermined location on a print medium, the apparatus comprising:
   a first printhead configured to fire black dye based ink droplets on the print medium;
   a second printhead configured to fire black pigment based ink droplets on the print medium; and
   a processing system configured to fortify the black content by controlling the first printhead to fire droplets on the predetermined location, the processing system being further configured to print the black content by controlling the second printhead to fire droplets on the predetermined location;
   wherein the processing system is further configured to determine whether the print medium is incompatible with the black pigment based ink, control the first printhead to fire droplets on the predetermined location in an essentially uniform, partial density pattern and/or in an essentially complete coverage in response to the print medium being incompatible with the black pigment based ink, and control the second printhead to omit the firing of droplets on the predetermined location in response to the print medium being incompatible with the black pigment based ink.

2. The apparatus according to claim 1, further comprising:
   a user interface configured to receive a selected print mode, the user interface being configured to communicate with the processing system, wherein the processing system is further configured to determine whether the print medium is incompatible with the black pigment based ink based on the selected print mode.

3. The apparatus according to claim 1, further comprising:
   a media detector configured to detect a print medium type, the media detector being configured to determine whether the print medium is incompatible with the black pigment based ink based on the print medium type.

* * * * *